(12) United States Patent
Picard et al.

(10) Patent No.: US 7,587,539 B2
(45) Date of Patent: Sep. 8, 2009

(54) METHODS OF INTER-INTEGRATED CIRCUIT ADDRESSING AND DEVICES FOR PERFORMING THE SAME

(75) Inventors: Jean Picard, Hooksett, NH (US); Barry Jon Male, West Granby, CT (US)

(73) Assignee: Texas Instruments Incorporated, Dallas, TX (US)

( * ) Notice: Subject to any disclaimer, the term of this patent is extended or adjusted under 35 U.S.C. 154(b) by 193 days.

(21) Appl. No.: 11/706,079

(22) Filed: Feb. 13, 2007

(65) Prior Publication Data
US 2007/0250648 A1     Oct. 25, 2007

Related U.S. Application Data

(60) Provisional application No. 60/745,550, filed on Apr. 25, 2006.

(51) Int. Cl.
*G06F 13/00* (2006.01)
(52) U.S. Cl. .......................... 710/104; 710/9
(58) Field of Classification Search .................... 710/8, 710/9, 10, 104
See application file for complete search history.

(56) References Cited

U.S. PATENT DOCUMENTS

| | | | |
|---|---|---|---|
| 5,790,888 A | 8/1998 | Dreyer et al. | |
| 5,941,976 A | 8/1999 | Gulick | |
| 6,032,213 A | 2/2000 | Gulick | |
| 6,097,218 A | 8/2000 | Callicott et al. | |
| 6,615,390 B1 | 9/2003 | Takagi | |
| 6,629,172 B1* | 9/2003 | Andersson et al. | 710/104 |
| 6,745,270 B1* | 6/2004 | Barenys et al. | 710/104 |
| 6,754,784 B1 | 6/2004 | North et al. | |
| 6,912,599 B2* | 6/2005 | Sicola et al. | 710/8 |
| 7,216,188 B2* | 5/2007 | Reid et al. | 710/74 |
| 2001/0029554 A1* | 10/2001 | Namba | 710/9 |
| 2002/0067638 A1* | 6/2002 | Kobayashi et al. | 365/185.01 |
| 2003/0128702 A1* | 7/2003 | Satoh et al. | 370/390 |
| 2006/0123168 A1* | 6/2006 | Lang | 710/110 |

* cited by examiner

*Primary Examiner*—Glenn A Auve
(74) *Attorney, Agent, or Firm*—John J. Patti; Wade J. Brady, III; Frederick J. Telecky, Jr.

(57) ABSTRACT

Inter-integrated circuit-capable devices for use on an inter-integrated circuit bus are disclosed. The inter-integrated circuit-capable devices include integrated, internally-configurable addressing registers in place of external pins. Cascaded systems of inter-integrated circuit-capable devices for easier addressing are also disclosed as are methods for writing address identifier codes to addressing registers of the cascaded, inter-integrated circuit-capable devices.

14 Claims, 6 Drawing Sheets

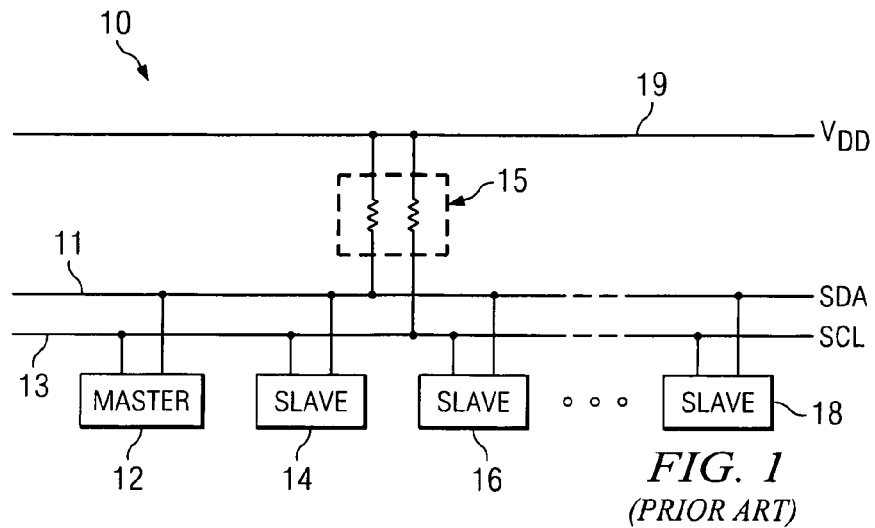
FIG. 1
(PRIOR ART)
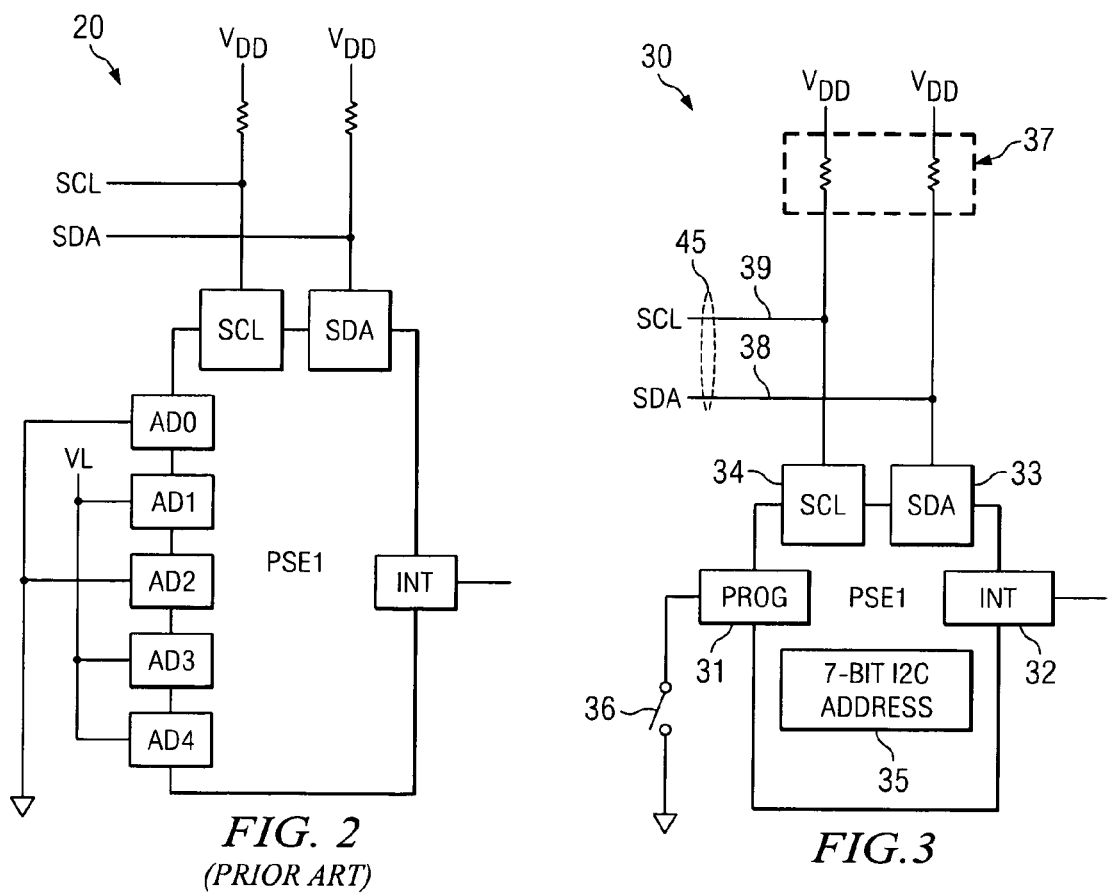
FIG. 2
(PRIOR ART)
FIG. 3

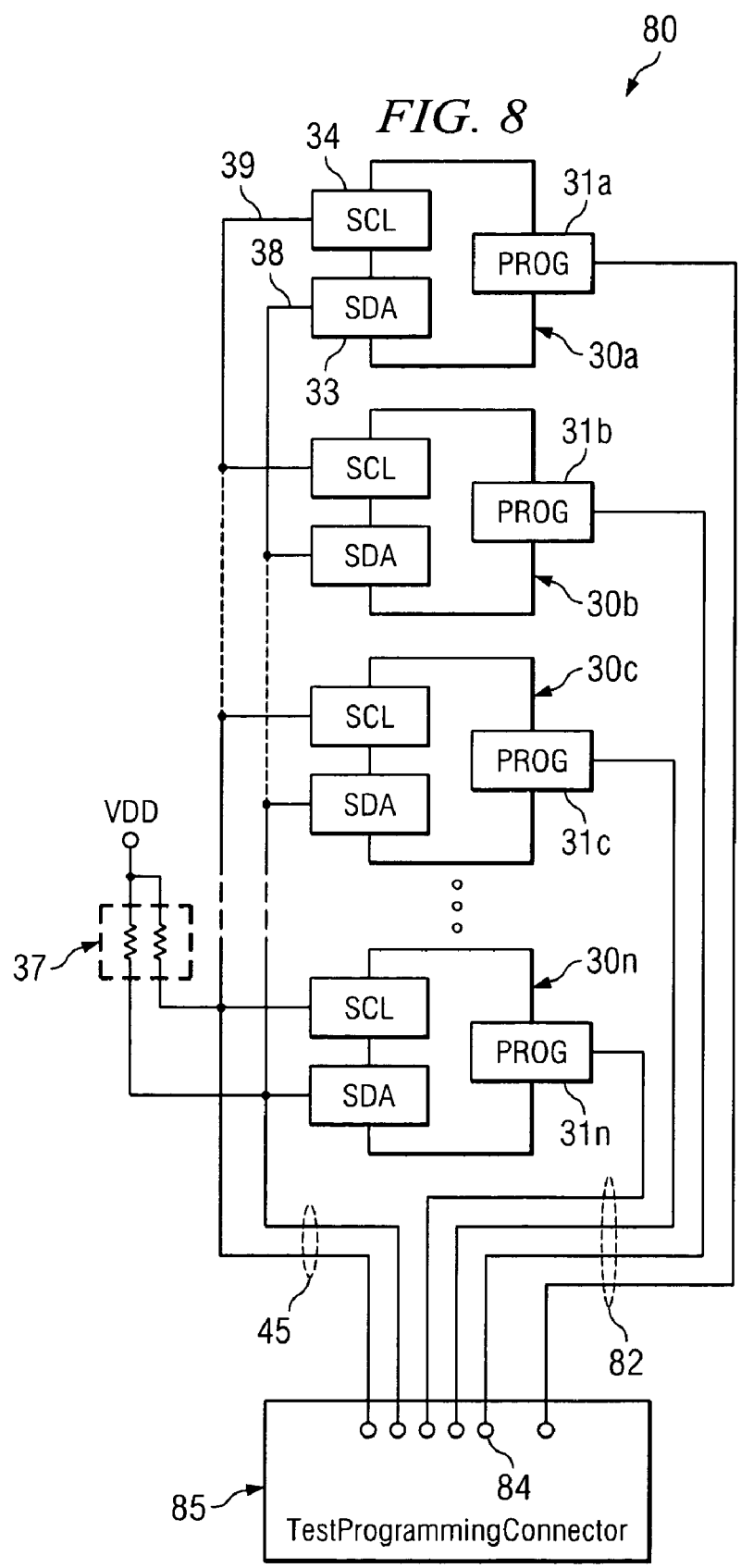

METHODS OF INTER-INTEGRATED CIRCUIT ADDRESSING AND DEVICES FOR PERFORMING THE SAME

CROSS REFERENCE TO RELATED APPLICATIONS

Priority to U.S. provisional patent application 60/745,550 entitled "Integrated I2C Addressing" filed Apr. 25, 2006, which is incorporated herein by reference, is claimed.

STATEMENT REGARDING FEDERALLY SPONSORED RESEARCH OR DEVELOPMENT (Not applicable)

BACKGROUND OF THE INVENTION

The present invention relates to methods of and devices and systems for inter-integrated circuit, or $I^2C$, addressing and, more particularly, to methods of and devices and systems for $I^2C$ addressing using $I^2C$-capable devices having internal addressing registers instead of address input/output pins.

Inter-integrated circuit buses, also known as $I^2C$ buses and inter-IC buses, were developed in the early 1980's as simple, relatively short-distance, relatively low speed, low-bandwidth buses for communication on a common circuit board. The $I^2C$ bus is a bidirectional, two-wire bus used for serially-transmitting data between at least one master and at least one slave. These data include addressing data, which, by convention, commonly uses seven (7) bits. An eighth bit is included with the seven-bit address to tell the receiving node to read (transmit) or to write (receive).

A typical $I^2C$ system 10 having one master 12 and three slave nodes 14, 16, and 18 is shown schematically in FIG. 1. The two wires 11 and 13 of the $I^2C$ bus include a serial data line (SDA) and a serial clock line (SCL), respectively. Pull-up resistors 15, which are electrically-coupled to a voltage source ($V_{DD}$) 19, are also provided for channel access. For example, pulling either of the two wires 11 and 13 to ground constitutes a logical low or zero (0), while allowing either of the lines to float constitutes a logical high or one (1).

The number of master devices and/or slave devices that is electrically-coupleable to the $I^2C$ bus, however, is limited, primarily, by the available addressing space. For example, if each device has a unique 7-bit address identifier code, there can be $2^7$, or 128, unique and distinguishable devices electrically-coupleable to the $I^2C$ bus.

The proliferation and availability of $I^2C$-capable devices and peripherals have resulted in the number of unique $I^2C$-capable devices far exceeding the number of available addresses. Even extending the seven-bit addressing protocol to an extended, 10-bit protocol has failed to resolve the problem.

Dedicating or reserving some number of addresses is also common. Such "reserved addresses" that are set aside for special purposes cannot be otherwise used. Thus, with current $I^2C$ systems, a full seven-bit addressing range (or an extended 10-bit addressing range) is lacking.

To further exacerbate the problem of sufficient addressing space, $I^2C$-capable devices or peripherals that are electrically-coupleable to an $I^2C$ bus, by design, dedicate a considerable if not significant portion of their available input/output (I/O) pins to device addressing. Referring to FIG. 2, there is shown a schematic of a conventional Texas Instruments power-source equipment (PSE) 20 having five I/O pins (labeled AD0 to AD4) dedicated exclusively for device addressing.

Accordingly, it would be desirable to provide means and methods for internally configuring the address identifier code of an $I^2C$ capable device or peripheral that can be electrically-coupled to an $I^2C$ bus without having to use addressing pins.

BRIEF SUMMARY OF THE INVENTION

Inter-integrated circuit-capable ($I^2C$-capable) devices for use on an $I^2C$ bus are disclosed. The $I^2C$-capable devices of the present invention include integrated, internally-configurable addressing registers in place of external input/output (I/O) pins.

Cascaded systems of $I^2C$-capable devices are also disclosed. Cascaded systems simplify writing address identifier codes to the addressing registers of a multiplicity of $I^2C$-capable devices. The program input pin of each following $I^2C$-capable device in the cascade is electrically-coupled to the interrupt output pin of the preceding $I^2C$-capable device. With this arrangement, the addressing registers of each of the $I^2C$-capable devices can be accessed and encoded using a single program input pin.

Parallel systems of $I^2C$-capable devices are also disclosed. Parallel systems also provide simplified writing address identifier codes to the addressing registers of a multiplicity of $I^2C$-capable devices. The program input pin of each following $I^2C$-capable device is electrically-coupled to a programming device using a plurality of select lines or a single-wire serial interface. An interrupt output pin is not needed. With this arrangement, the addressing registers of each of the $I^2C$-capable devices can be accessed and encoded without having to use the serial data line (SDA) or the serial clock line (SCL).

Methods for writing address identifier codes to the addressing registers of a multiplicity of $I^2C$-capable devices in a cascade and a parallel arrangement are also disclosed.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views.

FIG. 1 shows a schematic of a inter-integrated circuit device and bus in accordance with the prior art;

FIG. 2 shows a schematic of a conventional power-source electronic device having five pins (labeled AD0 to AD4) dedicated to device addressing in accordance with the prior art;

FIG. 3 shows a schematic of an $I^2C$-capable device having an internally-configurable, addressing register in accordance with the present invention;

FIG. 8 shows schematic of a parallel arrangement of I²C-capable devices having internally-configurable, addressing registers in accordance with the present invention.

DETAILED DESCRIPTION OF THE INVENTION

Figure 4:
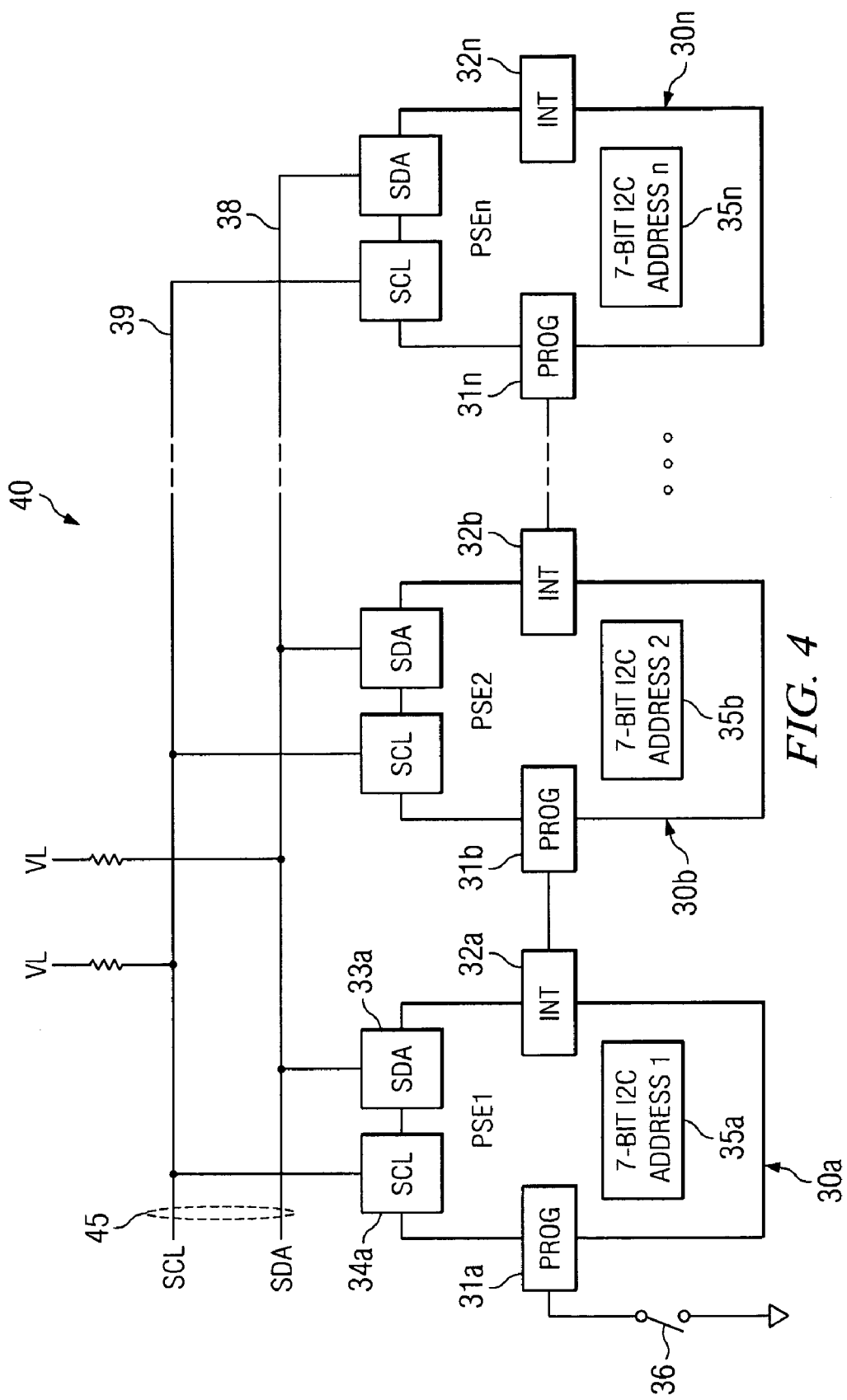
FIG. 4 shows a schematic of a cascade arrangement of $I^2C$-capable devices having internally-configurable addressing registers in accordance with the present invention.

U.S. provisional patent application 60/745,550 entitled "Integrated I2C Addressing" filed Apr. 25, 2006 is incorporated in its entirety herein by reference.

Integrated circuits (IC), devices, peripherals, and systems that can be electrically-coupled and controlled on an I²C-bus (hereinafter referred to collectively as "I²C-capable devices") are disclosed. More particularly, I²C-capable devices that use an internal addressing register in lieu of input/output (I/O) pins for addressing are disclosed.

Referring to FIG. 3, there is shown an I²C-capable device 30 having an internally-configurable, addressing register 35 in accordance with the present invention. Although the I²C-capable device 30 shown is labeled a PSE device and the addressing register 35 is shown as a seven-bit addressing register, the invention is not to be construed as being limited thereto. More particularly, the addressing registers 35 can be adapted to accommodate any number of bits for addressing and the I²C-capable device 30 is not limited to PSEs.

The I²C-capable device 30 of the present invention includes a serial data line (SDA) pin 33 and a serial clock line (SCL) pin 34 for electrically-coupling the I²C-capable device 30, respectively, to the SDA wire 38 and the SCL wire 39 of the I²C bus 45. The SDA pin 33 and SCL pin 34 perform a similar or substantially similar function as the SDA and SCL pins of conventional I²C-capable devices. Pull-up resistors 37 that are electrically-coupled the SDA wire 38 and the SCL wire 39 also perform a similar or substantially similar function as the pull-up resistors of conventional I²C-capable devices.

The addressing register 35 is a conventional register that is adapted to store a unique, pre-programmed, address identifier code that distinguishes each I²C-capable device 30 from any other I²C-capable device on the I²C bus 45. The addressing register 35 is adapted to provide standard, volatile, random access memory (RAM) data storage and/or non-volatile, erasable or electrically-erasable programmable read-only memory data storage. Examples of this type of memory include without limitation EPROM- and E²PROM-types. Those of ordinary skill in the art can appreciate that volatile RAM data storage would require address identifier code programming and re-programming every time the I²C-capable device is turned off. For the remainder of this disclosure, non-volatile data storage will be assumed.

For I²C-capable devices 30 having non-volatile data storage, at the time of manufacture, the I²C-capable device 30 is adapted with a non-volatile addressing register 35 that has a unique, pre-set address identifier code. The pre-set, address identifier code in the addressing register 35 can be locked, for example using a software or hardware lock, to prevent the fixed address identifier code from being changed without proper authorization. However, as will be described in greater detail below, the addressing register 35 of the I²C-capable device 30 is modifiable.

The I²C-capable device 30 also includes a program (input) PROG pin 31 and, optionally, an interrupt (output) INT pin 32. The PROG pin 31 is used for accessing and/or for programming the addressing register 35 in the I²C-capable device 30. As a result, the PROG pin 31 can be used to uniquely identify (using an address identifier code) and/or to modify the address identifier code of the I²C-capable device 30. More specifically, the PROG pin 31 operates as a chip select that is adapted for accessing the addressing register 35 of the I²C-capable device 30 and enabling the WRITE function. Access to the addressing register 35 through the PROG pin 31 for the purpose of modifying the unique address identifier code of the I²C-capable device 30 can occur at the time of manufacture and/or at any time subsequent to manufacture.

Figure 5:
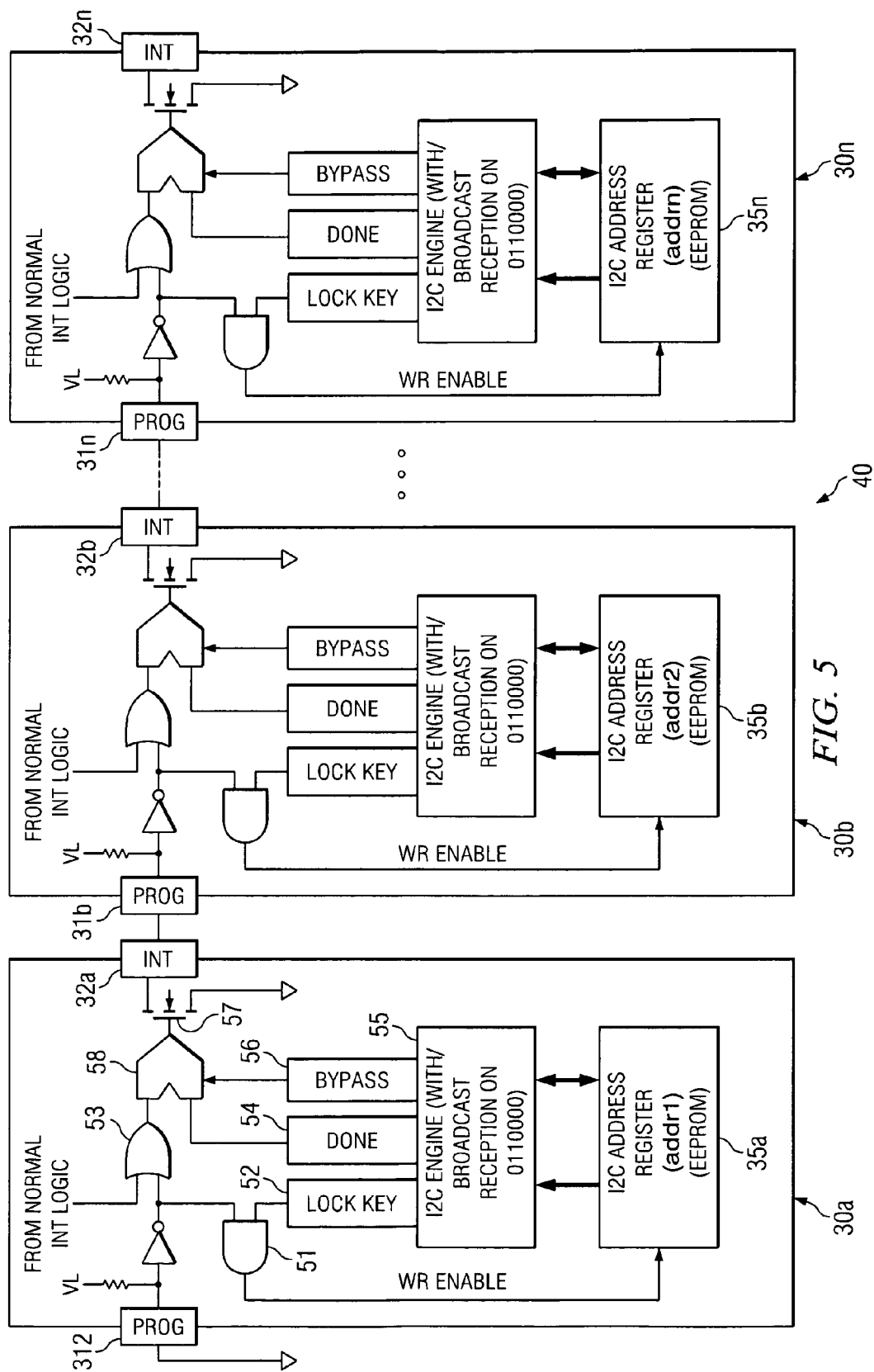
FIG. 5 shows a schematic of the internal logic of the cascade arrangement of $I^2C$-capable devices of FIG. 4 in accordance with the present invention.

Referring to FIG. 5, each I²C-capable device 30a includes an IC engine (chip) 55, a LOCK key bit reader 52, a DONE bit reader 54, and a BYPASS bit reader 56. The IC chip 55 is electrically-coupled to the SDA 33a and SCL 34a and is structured and arranged to perform the function of the I²C-capable device 30a when signaled by a master device to do so.

The LOCK key bit reader 52 prevents unauthorized users from writing to the addressing register 35a without the appropriate authorization code. According to exemplary logic diagram shown in FIG. 5, the addressing register 35a cannot be decoded or re-coded while the LOCK key bit reader 52 outputs a voltage or logic low (0). However, when the LOCK key bit reader 52 outputs a voltage or logic high (1), and the PROG pin 31a is at a voltage or logic low (0), access to the addressing register 35a for the purpose of modifying the address identifier code contained therein is enabled, i.e., the addressing register 35a is "unlocked".

The DONE bit reader 54 is integral to or controlled by the IC chip 55. The output of the DONE bit reader 54 is electrically-coupled to the input of a multiplexer ("MUX") 58. The MUX 58 is adapted to select or de-select the I²C-capable device 30a as will be described in greater detail below.

The BYPASS bit reader 56 is also integral to or controlled by the IC chip 55. The BYPASS bit reader 56 is adapted to lock out normal interrupt logic input fed into the logic OR gate 53. More specifically, the BYPASS bit reader 56 prevents the normal interrupt logic input into the logic OR gate 53 from affecting the output of the MUX 58 when the DONE bit reader 54 selects or de-selects the I²C-capable device 30a as will be described in greater detail below.

As shown in FIGS. 4 and 5, I²C-capable devices 30 can be cascaded, for example, for high port count applications. Cascading I²C-capable devices 30 facilitates pre-setting address identifier codes in the addressing registers 35a, 35b, and 35n and/or modifying the address identifier codes of a plurality of cascaded I²C-capable devices 30. Indeed, a cascade arrangement also substantially reduces the number of input pins needed to access an addressing register to modify the address identifier code contained therein to a single input pin.

In such a cascade arrangement 40, the PROG pin 31a of the first I²C-capable device 30a can be electrically-coupled to a logic low (0) or to an external switch 36. The PROG pins 31b and 31n of subsequent I²C-capable devices 30 in the cascade arrangement 40 are electrically-coupled, respectively, to the INT pins 32a and 32b of the immediately preceding I²C-capable devices 30a and 30b.

Figure 6:
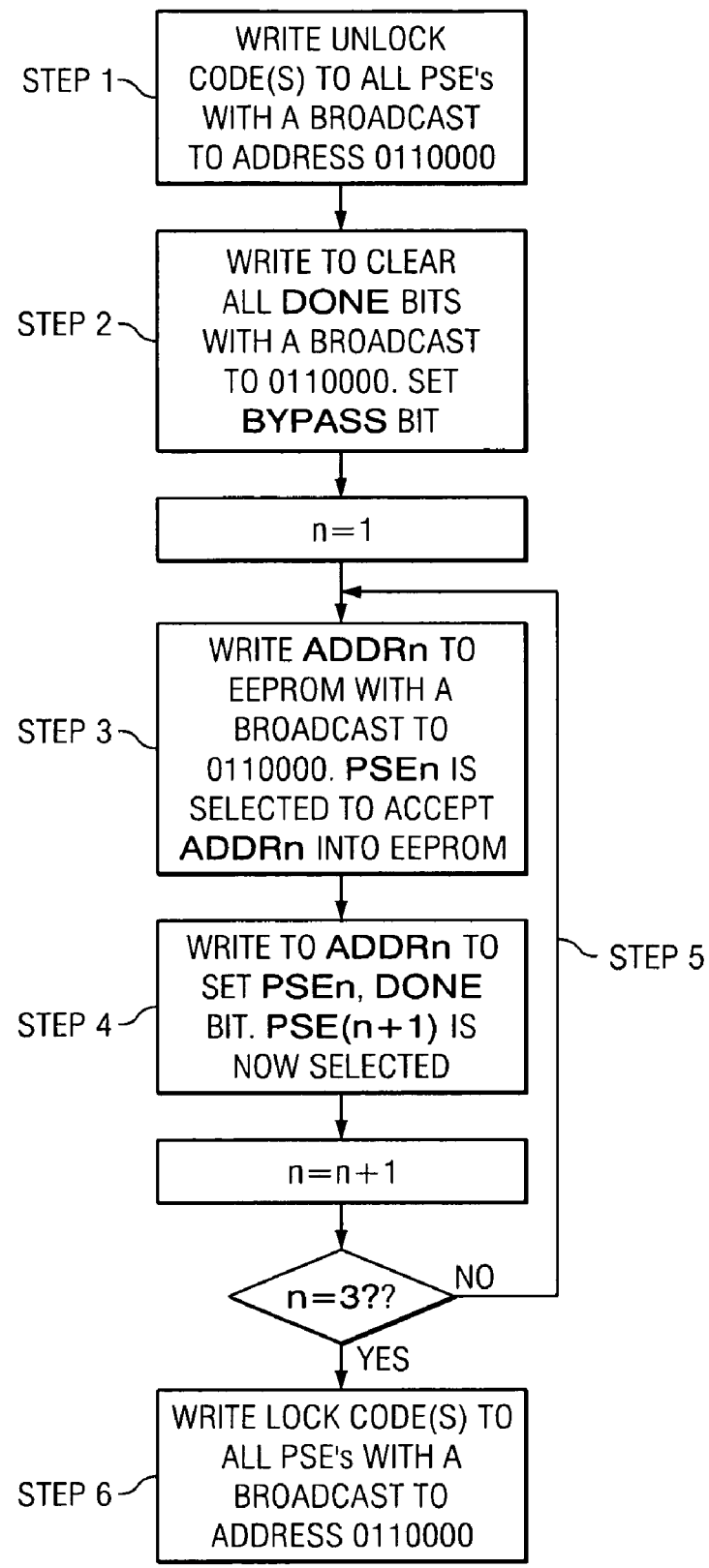
FIG. 6 shows a flow chart of a method of writing an address identifier code to the addressing register of each $I^2C$-capable device in a cascade or parallel arrangement.
Figure 7:
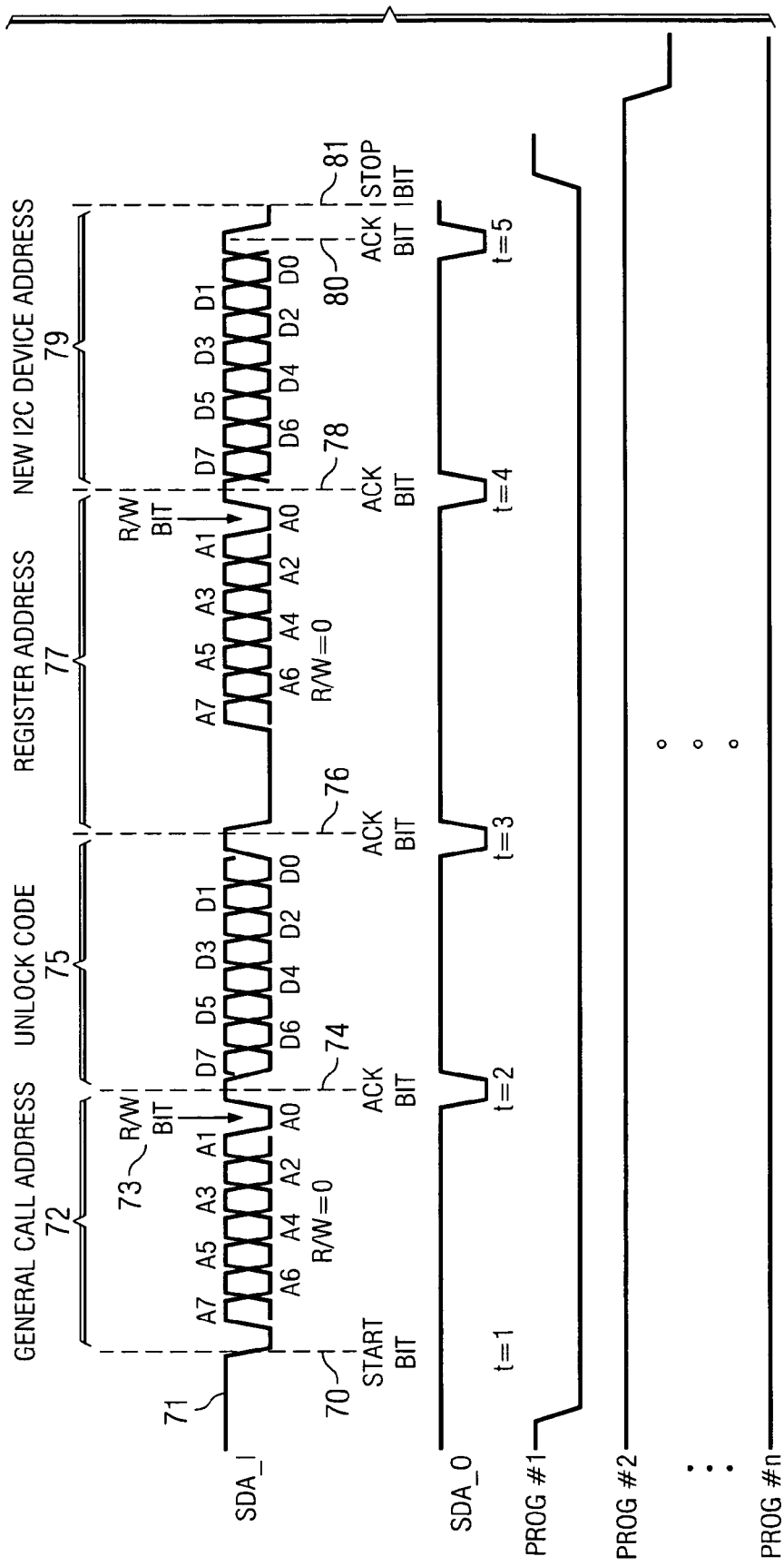
FIG. 7 shows a timing diagram for pre-setting or modifying address identifier codes of an I²C-capable device in accordance with the present invention.

An exemplary method for pre-setting or modifying the address identifier codes of each of the three cascaded I²C-capable devices 30a, 30b, and 30n in FIGS. 4 and 5 using a single PROG pin 31a is shown in FIG. 6. Initializing or pre-setting address identifier codes can proceed sequentially from the first I²C-capable device 30a to the last I²C-capable device 30n or, alternatively, it can be done randomly. For purposes of clarity, the method will address pre-setting or modifying identifier codes sequentially. A timing diagram for pre-setting or modifying an address identifier code for a single I²C-capable device 30 is shown in FIG. 7. Those of ordinary skill in the art can appreciate that the logic gates and logic device used are for illustrative purposes only.

First, an access or unlock code can be transmitted to the IC chip 55 associated with each I²C-capable device 30a, 30b, and 30n (STEP 1) electrically-coupled to the I²C bus 45. The access or unlock code can be transmitted over the I²C bus 45 using the SDA line 39 and SCL line 38 or, alternatively, can be transmitted using the PROG pin 31a. The access or unlock code (0110000 in the figures) will globally unlock all of the addressing registers 35a, 35b and 35n, enabling an authorized user to WRITE to a unique addressing register 35a, 35b, and/or 35c when the appropriate I²C-capable device 30a, 30b, and 30n, respectively, is also designated. Although, in the example, this is a global access or unlock code, individual access or unlock codes can be provided to each I²C-capable device 30a, 30b, and 30n in the cascade. However, doing so would be more cumbersome and time consuming.

The LOCK key bit reader 52 of each I²C-capable device 30a, 30b, and 30n, is structured and arranged to read the access or unlock code or bit. The LOCK key bit reader 52 is further adapted to output a voltage or logic high (1), for example to a logic AND gate 51 that is also electrically-coupled to the PROG pin 31a, when it identifies the access or unlock code or bit. If the switch 36 electrically-coupled to the PROG pin 31a is closed, PROG pin 31a is driven low (0), which, in combination with the voltage or logic high (1) output from the LOCK key bit reader 52, enables the WRITE function at the addressing register 35a.

Next or concurrent with enabling the WRITE function at the first addressing register 35a, all of the DONE bits are cleared and the BYPASS bit is set (STEP 2).

For example, the DONE bit reader 54 is adapted to read a DONE bit contained in the access or unlock code or bit and to output a voltage or logic high (1) or low (0) to the MUX 58. If the DONE bit reader 54 outputs a voltage or logic high (1), the MUX 58 selects the I²C-capable device 30a. Conversely, if the DONE bit reader 54 outputs a voltage or logic low (0), the MUX de-selects the I²C-capable device 30a.

The BYPASS bit reader 56 is adapted to read a BYPASS bit contained in the access or unlock code and to output a voltage or logic high (1) or low (0) to the MUX 58. When the BYPASS bit reader 56 outputs a voltage or logic high (1), the first I²C-capable device 30a is selected and all other I²C-capable devices 30b and 30n are de-selected.

Subsequently, the address identifier code of the first I²C-capable device 30a is written to the first addressing register 35a and the first I²C-capable device 30a is caused to accept and store the address identifier code (STEP 3). Finally, the DONE bit register 54 reads a STOP bit. When the STOP bit is received, DONE bit register 54 causes the LOCK key bit reader 52 to output a voltage or logic low (0), which returns the addressing register 35a of the first I²C-capable device 30a to READ only (0).

The DONE bit reader 54 also outputs a voltage or logic low (0) to the MUX 58, which biases or closes the gate of an integrated circuit switch 57, driving or draining the INT pin 32a to a voltage or logic low (0). In this state, the first I²C-capable device 30a is de-selected and the next I²C-capable device 30b is selected (STEP 4).

Process STEPS 3 and 4 are repeated for the second I²C-capable device 30b, and for all subsequent I²C-capable device 30b. (STEP 5) Accordingly, in this fashion, strings of cascaded (or parallel) I²C-capable devices 30 can be programmed using a single external selection logic.

After the address identifier code in the addressing register 35n of the last I²C-capable device 30n is set and the DONE bit is set, the address identifier codes in the address registers 35a, 35b, and 35n can be locked (STEP 6). Alternative, when the DONE bit is received for each I²C-capable device 30a, the DONE bit reader 54 can be adapted to cause the LOCK key bit reader 52 to output a voltage or logic low (0) to return the individual addressing registers to READ only (0) mode.

As an alternative to a cascade arrangement 40, a plurality of I²C-capable devices 30 can also be electrically-coupled in a parallel arrangement. For example, FIG. 8 shows an exemplary illustration of a plurality of I²C-capable devices 30a to 30n that is disposed in a parallel arrangement 80. Such an arrangement 80 facilitates pre-setting and/or modifying address identifier codes in the addressing registers (not shown) of the I²C-capable devices 30a to 30n.

Each of the respective PROG pins 31a to 31n of each of the I²C-capable devices 30a to 30n in the parallel arrangement 80, is electrically-coupled to unique I/O pins 84 of a programming device 85. FIG. 8 shows separate select lines 82 electrically-coupling the PROG pins 31a to 31n to the programming device 85. Alternatively, a single-wire serial interface can also be used in lieu of the select lines 82. Advantageously, using a single-wire serial interface enables users to select the particular I²C-capable device for addressing and to write an address identifier code to the addressing register of the selected I²C-capable device without having to use the I²C bus 45. INT output pins are not required with a parallel arrangement 80.

Referring to FIG. 7, exemplary waveforms for the SDA line 33a input (SDA_I) and SDA line 33a output (SDA_O) are shown. Waveforms for the PROG pins 31a (PROG #1), 31b (PROG #2), and 31n (PROG #3) are also shown. For illustrative purposes only, PROG #1 is driven to a voltage or logic low (0) and PROG #2 and PRG #3 are driven to a voltage or logic high (1). Hence, PROG #2 and PROG #3 remain in a READ only (0) state and PROG #1 is adapted to transition from a READ (0) to a WRITE (1) state.

The SDA_O (output) waveform remains at a voltage or logic high (1), i.e., no output, except when the IC chip 55 transmits an acknowledge bit ACK to the I²C master, e.g., at times t=2, t=3, t=4, and t=5. As is well-known to the art, the acknowledge bit ACK is used to signal the master device that the slave device has received the previous transmission.

The SDA_I (input) waveform is shown, initially, at a voltage or logic high (1), corresponding to a WRITE mode 71. At time t=1, the I²C master transmits a start bit 70 followed by a general or global call address 72, which is transmitted to each of the I²C-capable devices electrically-coupled to the I²C bus that is controlled by the I²C master device. Although the general or global call address 72 shown in FIG. 7 is an 8-bit byte, those of ordinary skill in the art again can appreciate that the number of bits in the general or global call address can be 8, 10 or any whole number greater than 8 or 10. Also, although the general or global call address 72 can be transmitted "globally" to all I²C-capable devices electrically-coupled to the I²C bus, alternatively, the I²C master device can transmit a call address 72 addressed to a single I²C-capable device or to less than all of the I²C-capable devices disposed on the I²C bus.

At least one bit in the general or global call address 72, such as the A0 bit 73, is a READ/WRITE bit. The READ/WRITE bit prepares or enables each of I²C-capable devices or, in the alternate, an appropriate I²C-capable device, for a WRITE operation.

At t=2, after receipt of the general or global call address 72, at least one of the I²C-capable devices transmits an acknowledgement bit ACK 74 via the SDA_0 to the I²C master device. Once the I²C master device receives the ACK bit 74, the I²C master device transmits an unlock code or bit 75. The unlock code or bit 75 can be transmitted to all of the I²C-capable devices or, in the alternate, to one or less than all of the I²C-capable devices.

The LOCK key reader reads the unlock code or bit 75, outputting a voltage or logic high (1), which enables the WRITE (1) function of the addressing register(s).

At t=3, receipt of the unlock code or bit 75 is acknowledged by at least one of the I²C-capable devices using another ACK bit 76. Once the I²C master device receives the ACK bit 76, the I²C master device transmits a specific address identifier code 77. The specific address identifier code 77 identifies the unique I²C-capable device whose address identifier code is to be modified.

At t=4, receipt of the address identifier code 77 is acknowledged by the unique I²C-capable device using another ACK bit 78. Once the I²C master device receives the ACK bit 78, the I²C master device transmits a new address identifier code 79 to the unique I²C-capable device, receipt of which is again acknowledged by the unique I²C-capable device using an ACK bit 80 (at t=5).

The new address identifier code 79 is subsequently written to the addressing register of the unique I²C-capable device. The I²C master device then transmits a STOP bit 81 and the addressing process can be repeated for the next and all subsequent I²C capable devices in the cascade or parallel arrangement.

Although the invention has been described using the SDA and SCL lines for register addressing, it would also be possible to program each I²C-capable device using just the PROG pin, which is to say, without using the SDA and SCL lines.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. An inter-integrated circuit (I²C) compatible apparatus comprising:
   a serial data pin that is configured to be coupled to a serial data line of an I²C bus;
   a serial clock pin that is configured to be coupled to a serial clock line of the I²C bus;
   a program input pin that receives encoding data;
   an addressing register having an address identifier code that is configured to be modified by the encoding data;
   logic coupled between the program input pin and the address register;
   a controller that is coupled to the serial data pin, the serial clock pin, and the logic, wherein the controller is configured to decode an unlock signal, and wherein the controller provides control signals to enable the logic to transmit the encoding data from the program input pin to the address register based on at least a portion of the decoded unlock signal, and wherein the controller is configured to provide DONE and BYPASS signals to the logic to select and de-select the apparatus based on at least a portion of the decoded unlock signal.

2. The apparatus as recited in claim 1, wherein the addressing register further comprises at least one of a volatile random access memory (RAM), non-volatile memory, an erasable programmable read-only memory (EPROM), or a non-volatile, electrically-erasable programmable read-only memory (E²PROM).

3. The apparatus as recited in claim 1, wherein the controller further comprises a lock to prevent the address identifier code in the addressing register from being modified.

4. The apparatus as recited in claim 1, wherein the apparatus further comprises an interrupt output pin coupled to the logic.

5. The apparatus as recited in claim 1, wherein controller further comprises:
   an I²C engine that generates control signals;
   a DONE bit reader that decodes the control signals to generate the DONE signal; and
   a BYPASS bit reader that decodes the control signals to generate the BYPASS signal.

6. An apparatus comprising:
   an I²C bus having a serial data line and a serial clock line; and
   a plurality of I²C compatible devices arranged in a cascaded sequence, wherein each I²C compatible device includes:
      a serial data pin that is coupled to the serial data line of the I²C bus;
      a serial clock pin that is coupled to a serial clock line of the I²C bus;
      a program input pin that is receives encoding data from a source;
      an addressing register having an address identifier code that is configured to be modified by the encoding data;
      logic coupled between the program input pin and the address register;
      an interrupt output pin coupled to the logic; and
      a controller that is coupled to the serial data pin, the serial clock pin, and the logic, wherein the controller is configured to decode an unlock signal, and wherein the controller provides control signals to enable the logic to transmit the encoding data from the program input pin to the address register based on at least a portion of the decoded unlock signal, and wherein the controller is configured to provide DONE and BYPASS signals to the logic to select and de-select its I²C compatible device based on at least a portion of the decoded unlock signal.

7. The system as recited in claim 6, wherein the I²C engine further comprises a lock to prevent the address identifier code in the addressing register from being modified.

8. The system as recited in claim 6, wherein the controller further comprises:
   an I²C engine that generates control signals;
   a DONE bit reader that is adapted to decode the control signals to generate the DONE signal; and
   a BYPASS bit reader that is adapted to decode the control signals to generate the BYPASS signal.

9. A system comprising:
   an I²C bus having a serial data line and a serial clock line; and
   a plurality of I²C compatible devices arranged in parallel with each other, wherein each I²C compatible device includes:
      a serial data pin that is coupled to the serial data line of the I²C bus;
      a serial clock pin that is coupled to a serial clock line of the I²C bus;
      a program input pin that receives encoding data individually from a source;
      an addressing register having an address identifier code that is adapted to be modified by the encoding data;
      logic coupled between the program input pin and the address register; and an I²C engine that is coupled to the serial data pin and the serial clock pin, wherein the I²C engine provides control signals to enable the logic to transmit the encoding data from the program input pin to the address register.

10. The system as recited in claim 9, wherein the I²C engine further comprises a lock to prevent the address identifier code in the addressing register from being modified.

11. The system as recited in claim 9, wherein the apparatus further comprises an interrupt output pin coupled to the logic.

12. A method for writing an address identifier code to a plurality of I²C compatible devices, the method comprising:
    writing an unlock code to each of the I²C compatible devices;
    decoding the unlock code by a controller in each of the I²C compatible devices;
    write-enabling an address register in each of the I²C compatible devices based on at least a portion of the decoded unlock code;
    generating a BYPASS signal based on at least a portion of the decoded unlock code;
    writing the address identifier code to each I²C compatible device if the BYPASS signal indicates writing; and
    asserting a DONE signal for each I²C compatible device after the address identifier code is written.

13. The method as recited in claim 12, wherein the method further comprises, for the plurality of I²C compatible devices when arranged in a cascaded sequence, sequentially performing for each I²C compatible device the steps of:
    writing an unlock code to each of the I²C compatible devices;
    decoding the unlock code by a controller in each of the I²C compatible devices;
    write-enabling an address register in each of the I²C compatible devices based on at least a portion of the decoded unlock code;
    generating a BYPASS signal based on at least a portion of the decoded unlock code;
    writing the address identifier code to each I²C compatible device if the BYPASS signal indicates writing; and
    asserting a DONE signal for each I²C compatible device after the address identifier code is written.

14. The method as recited in claim 12, wherein the method further comprises, for the plurality of I²C compatible devices when arranged in parallel to one another, performing for each I²C compatible device the steps of:
    writing an unlock code to each of the I²C compatible device;
    decoding the unlock code by a controller in each of the I²C compatible devices;
    write-enabling an address register in each of the I²C compatible devices based on at least a portion of the decoded unlock code;
    generating a BYPASS signal based on at least a portion of the decoded unlock code;
    writing the address identifier code to each I²C compatible device if the BYPASS signal indicates writing; and
    asserting a DONE signal for each I²C compatible device after the address identifier code is written.

* * * * *